S. R. PARKES.
WINDOW SASH FASTENER.
APPLICATION FILED NOV. 27, 1915.
1,338,250.
Patented Apr. 27, 1920.
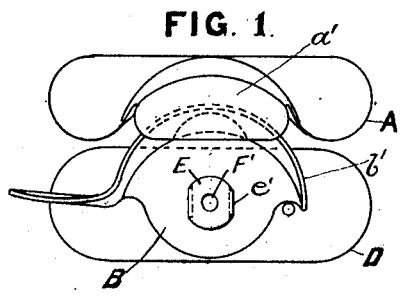
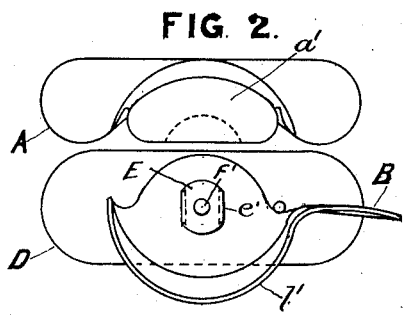
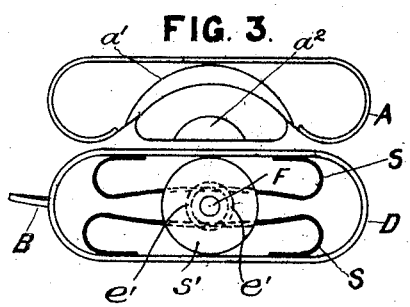
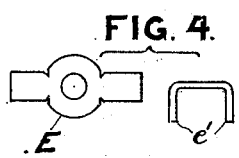
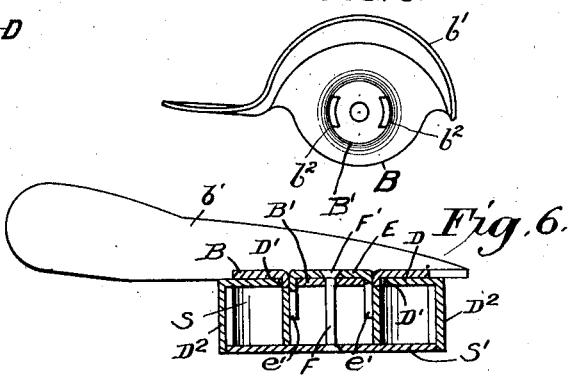

UNITED STATES PATENT OFFICE.

SAMUEL ROWLAND PARKES, OF WILLENHALL, ENGLAND.

WINDOW-SASH FASTENER.

1,338,250.   Specification of Letters Patent.   Patented Apr. 27, 1920.

Application filed November 27, 1915. Serial No. 63,709.

*To all whom it may concern:*

Be it known that I, SAMUEL ROWLAND PARKES, subject of the King of Great Britain, residing at Pretoria Works, Willenhall, in the county of Stafford, England, have invented new and useful Improvements in Window-Sash Fasteners, of which the following is a specification.

This invention has reference to fasteners for window sashes of the kind commonly known in the trade as "Fitch fasteners". The object of the invention is to simplify the construction of the part which, by the aid of springs, holds the locking lever or operative portion of the fastener in its latched and unlatched position, and at the same time reduce the cost of manufacture.

The invention is illustrated on the accompanying drawing in which:

Figure 1 is a plan view of the window sash fastener in its locked or fastened position.

Fig. 2 is a similar view showing the fastener unlocked or unfastened.

Fig. 3 is an inverted plan view of Fig. 1.

Fig. 4 is a view showing a strip of metal, before and after being bent, which forms the projections on the underside of the locking lever or operative part of the fastener.

Fig. 5 is a plan view of the lever showing the radially formed slots through which the projections pass.

Fig. 6 is a transverse sectional view of the sash fastener with the lever swung around to show the lugs of the strip of metal.

The main parts of the sash fastener are made as is usual from sheet metal by suitable press tools. A is the part to be secured to the upper window sash, having the raised portion $a'$. B is the lever or operative part of the fastener, pivotedly connected to its base D. The radially curved edge $b'$ of this lever, when in its fastened or locked position, fits under the raised portion $a'$ of the part A, the projection $a^2$, on the underside of the raised portion $a'$, bearing against the inner surface of the edge $b'$ and thus drawing the two sashes tightly together. Springs S are located in the hollow portion on the underside of the base D for holding the lever B in its operative and inoperative positions.

Now to hold this lever B in its operative and inoperative positions the springs S must bear against projections correlatively operative with the said lever, and in order to accomplish this I provide two radially formed slots $b^2$ in the bearing surface of the lever, as clearly shown by Fig. 5. I then shape and form a strip of metal E, as shown by Fig. 4, so that the downwardly bent ends $e'$, when inserted in the slots $b^2$, project therethrough for the springs S to bear against, as clearly shown by Fig. 3. The center portion of the strip E, when the ends $e'$ are inserted in the slots $b^2$, may lie flush with the outer surface of the lever by forming a corresponding recess in the surface of such lever. All the parts are held together by a headed pin passing through a hole in the center portion of the strip E and through a hole in the lever B, a washer S' being fixed on the end of said pin. This pin acts as the axis on which the lever B pivots.

The base D is provided with a central circular opening D' into which the depressed portion B' of the lever B extends and which opening forms a bearing for the depressed portion of the lever in the pivotal action of the latter. The strip E has its central portion arranged in the depression of the lever while the side portions or lugs $e'$ of the strip E pass through the arcuate slots $b^2$ of the lever B. The strip E and the lever B are secured to the base by a rivet F piercing the strip E, the lever B and the washer S'. The pin F is provided at its upper end with a head F' arranged as clearly shown in Figs. 1 and 2. The washer S' which fits against the lower edges of the springs, is of circular form and extends entirely across the space between the side portions of the marginal flange $D^2$ of the base D. The lever B is arranged flat upon the upper face of the base D and the lugs or side portions $e'$ of the strip E are engaged by the springs and are rigidly interlocked with the lever by being passed through the slots $b^2$ thereof.

It will be obvious the slots $b^2$ in the bearing surface of the lever may be straight instead of curved, but by forming these slots radially the springs act only as a check on the movement of the lever when in its operative and inoperative positions.

What I claim as my invention, and desire to secure by Letters Patent is:—

A sash fastener, including a base having a circular opening, a lever arranged upon the base and provided at the said opening with opposite slots, a strip arranged upon the upper face of the lever and extending across the space between the said slots and provided with spaced lugs extending through the said slots and projecting downwardly from the lever into the base, springs arranged within the base in position for engaging the lugs at opposite sides of the said opening, a washer arranged within the base and fitting against the lower edges of the springs, and a pivot piercing the strip, the lever and the washer and securing the said parts to the base.

In testimony whereof I have signed my name to this specification in the presence of two subscribing witnesses.

SAMUEL ROWLAND PARKES.

Witnesses:
F. C. MOUNTNEY,
B. A. READ.